United States Patent [19]

Schopper

[11] Patent Number: 4,915,457
[45] Date of Patent: Apr. 10, 1990

[54] LOAD-SENSITIVELY CONTROLLABLE BRAKING PRESSURE CONTROL UNIT

[75] Inventor: Bernd Schopper, Hattersheim, Fed. Rep. of Germany

[73] Assignee: Alfred Teves GmbH, Frankfurt am Main, Fed. Rep. of Germany

[21] Appl. No.: 839,788

[22] Filed: Mar. 14, 1986

[30] Foreign Application Priority Data

Mar. 16, 1985 [DE] Fed. Rep. of Germany ....... 3509605

[51] Int. Cl.$^4$ .............................................. B60T 8/22
[52] U.S. Cl. .................................................. 303/22.8
[58] Field of Search .............. 303/6 C, 22 R, 56, 22.1, 303/22.6, 22.7, 22.8

[56] References Cited

U.S. PATENT DOCUMENTS

| 2,852,370 | 6/1979 | Riquart | 303/22 R |
| 4,332,423 | 6/1982 | Schopper et al. | 303/22 R |

FOREIGN PATENT DOCUMENTS

| 277518 | 11/1965 | Australia | 303/22 R |
| 2027573 | 11/1971 | Fed. Rep. of Germany | 303/22 R |
| 3010358 | 10/1982 | Fed. Rep. of Germany | |
| 2048408 | 12/1980 | United Kingdom | |
| 2158902 | 11/1985 | United Kingdom | |
| 2160605 | 12/1985 | United Kingdom | |

*Primary Examiner*—Duane A. Reger
*Attorney, Agent, or Firm*—Robert P. Seitter

[57] ABSTRACT

A braking pressure control unit is disclosed, including a transmission lever acting on actuating tappets of a control valve, the lever is articulated through the intermediary of a first spring arrangement attached to a vehicle part which changes its position relative to the braking pressure control unit in a load-sensitive manner. Between the transmission lever and the control valve actuating tappets, a second spring arrangement is provided, which urges the transmission lever against a stop affixed to the housing. The transmission lever is adjusted to provide a clearance between the lever and the actuating tappets. When the setting of the load-sensitive transmission arrangement is clearance-free, incorrect adjustments of the control valve will not cause appreciable variations of the valve change-over pressure.

2 Claims, 1 Drawing Sheet

BEST AVAILABLE COPY

LOAD-SENSITIVELY CONTROLLABLE BRAKING PRESSURE CONTROL UNIT

BACKGROUND OF THE INVENTION

The present invention relates to a load-sensitively controllable braking pressure control unit having at least one control valve associated with a brake circuit and arranged in a housing, which is a attachable to a vehicle part. An actuating tappet of the control valve protrudes from the housing and a transmission lever, which is acted upon by a first spring arrangement, is adapted to be swivelled relative to the housing and bears against the actuating tappet. The spring arrangement is mounted at a vehicle part for articulated movement relative to the housing by way of a length-adjustable connecting arrangement, at the free end of the transmission lever, and a second spring arrangement clamped between the transmission lever and the actuating tappet of the valve.

In load-sensitive braking pressure control units, the change-over point, i.e. the amount of braking pressure at which the pressure control comes in, is variable and in dependency on vehicle load. For that purpose, the braking pressure control unit is provided with a transmission lever, which is adapted to be swivelled, against which the control piston of the valve of the braking pressure control unit abuts and at which one end of a spring arrangement is articulated. The other end of the spring arrangement is mounted at a vehicle part for articulated movement and the position of which is load-sensitively variable relative to the braking pressure control unit. When the vehicle load is changed, the force of the spring arrangement acting upon the transmission lever is correspondingly changed.

It is difficult and expensive to install such a braking pressure control unit in a loaded vehicle and, in particular, to connect the spring arrangement to the vehicle part and to adjust the spring arrangement such that the actual change-over pressure of the valve just reaches the value desired with respect to the ideal braking pressure characteristic curve.

In the German printed and published patent application 20 27 573, a braking pressure control unit of this general type is disclosed, wherein two spring arrangements connected to a transmission lever are provided. One spring arrangement serves as a control spring and is connected to a vehicle part, which changes its position relative to the braking pressure control unit in a load-sensitive manner, through the intermediary of a length-adjustable connecting arrangement, whereas the other spring arrangement serves as a compensating spring and bears against the actuating tappet of the control valve. When the control spring is loaded in order to transmit a control force, the compensating spring is compressed and the transmission lever can abut directly against the actuating tappet of the valve without the intermediary of the interposed compensating spring. In this known braking pressure control unit it is particularly difficult to connect the spring arrangement to the vehicle part and to adjust the spring arrangement such that the control force generated by the two spring arrangements arranged one behind the other corresponds exactly to the control force desired in view of the ideal braking pressure characteristic curve. Since this arrangement provides that the force exerted in the event of an expansion of the compensating spring offsets the effect of the control spring, a slight shift of the length-adjustable connecting arrangement results in a considerable change of the control force.

SUMMARY OF THE INVENTION

It is, therefore, an object of the present invention to create a braking pressure control unit of the type referred to hereinabove wherein a slight shift of the length-adjustable connecting arrangement will not effect the control force.

This object is achieved according to the present invention in that the load release of a second spring arrangement is limited by means of a stop associated with the transmission lever and affixed to the housing.

According to an important feature of the invention, there is provided a predetermined clearance space between the transmission lever and the actuating tappet with the transmission lever abutted against the stop. When the first spring arrangement is disconnected from the vehicle part which changes its position relative to the braking pressure control unit, the transmission lever is pressed against the stop by means of the second spring arrangement. In this situation, the second spring arrangement is still preloaded thus assuring that in this position of the transmission lever a minimum control force and thus a minimum change-over pressure of the braking pressure control unit is achieved. Accordingly, the braking pressure control unit can be assembled and supplied by the manufacturer and with exact predetermined setting.

According to an important aspect of the invention, a braking pressure control unit preassembled in such a manner is attached to the associated vehicle part, and the first spring arrangement is mounted for articulated movement at the position-variable vehicle part.

A still further important aspect of the invention provides for a zero clearance setting of the first spring arrangement between the vehicle part and the transmission lever through a length adjustable connecting arrangement. Accordingly, incorrect length adjustments are substantially eliminated by the second spring arrangement without effecting the change-over pressure of the valve. This feature is of particular advantage in the event of large-scale fitting on the assembly line.

Also, necessity of gauges and braking pressure set-ups for checking the correct setting of the change-over pressure is eliminated. The invention further compensates for settling effects of the vehicle suspension, i.e. permanent changes of the relative position of vehicle parts, which are load-sensitively movable to each other.

According to a preferred embodiment of the present invention, the torques generated by the spring forces of the two spring arrangements are identical when the transmission lever abuts against the actuating tappet of the valve. In this embodiment, the control force rises constantly in dependence upon the travel covered by the position-variable vehicle part.

According to another feature of the invention, it is provided that a spring plate is arranged between the actuating tappet of the valve and the second spring arrangement, and according to a still further embodiment, a second control valve is provided therein and the spring plate abuts against the actuating tappets of both control valves. In this embodiment, the actuating tappets protrude from the housing on the same side and the spring plate, which is tiltably arranged provided for an even distribution of the control force to both actuating tappets.

DETAILED DESCRIPTION OF THE DRAWING

Figure 1:
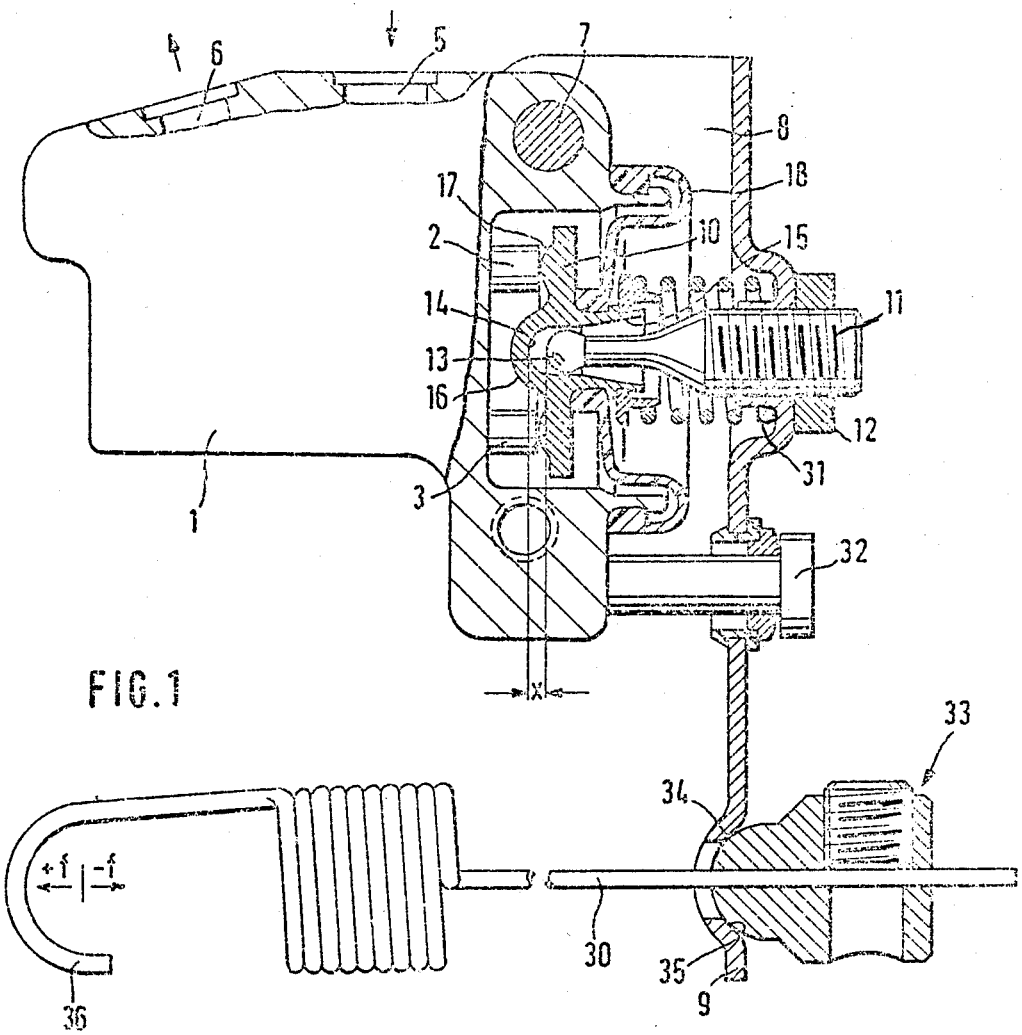
Figure 2:
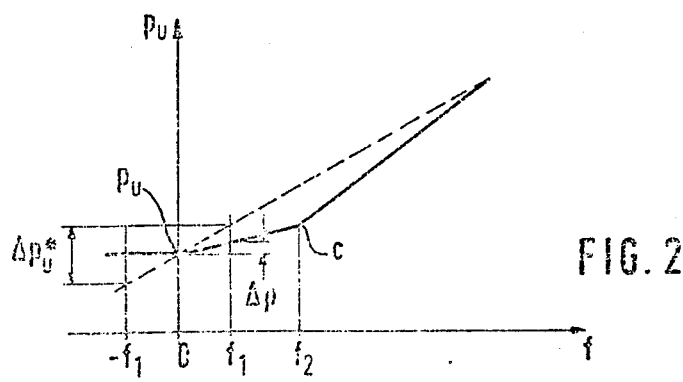

The invention will be better understood after a reading of the Detailed Description of the Preferred Embodiment in conjunction with the accompanying drawings wherein:

FIG. 1 shows a load-sensitively controlled braking pressure control unit for a dual-circuit brake system embodying the principles of the invention; and FIG. 2 is a pressure-displacement diagram which illustrates the variation of the change-over pressure point of the valve as a function of the displacement of the control unit spring.

DETAILED DESCRIPTION OF THE PREFERRED EMBODIMENT

Shown in FIG. 1 is a braking pressure control unit including a housing 1, wherein two control valves are arranged. The control valves are arranged beside one another in a parallel manner and are each equipped with an actuating tappet 2, 3 which protrudes from the housing 1 on the same side. In FIG. 1, the actuating tappets 2, 3 are turned by 90° into the drawing plane. Each control valve is located in a brake circuit of a dual-circuit brake system between an inlet connection 5, which is connected to a braking pressure source, and an outlet connection 6, which leads to at least one wheel brake cylinder. The control valves, whose design is not depicted, enable in a known manner the control of the outlet pressure in dependence upon the pressure prevailing at the inlet and of the force acting upon the actuating tappet 2 or 3. The tappets can be shaped, for instance, as described in the German printed and published patent application 29 30 476 and can act as pressure limiting valves or pressure reducing valves. The control valves are open when the actuating tappets 2, 3 are pressed in. When a specific pressure is exceeded, the actuating tappets 2, 3 will be moved to the right in FIG. 1, in opposition to the force acting upon their ends.

In the braking pressure control unit illustrated in FIG. 1, the force acting on the actuating tappets 2, 3 is load-sensitively variable. At the housing 1, a transmission lever 8, which is adapted to be swivelled about a bearing axle 7 arranged stationary in relation to the housing, is formed, one end 9, of which by way of first spring arrangement 30 connectable to a vehicle part, whose position in relation to the housing is load-sensitively variable. The load-sensitive control force acting upon the end 9 of the transmission lever 8 is distributed to both actuating tappets 2, 3 through the intermediary of an interposed tilting element 10.

The spring arrangement 30 is shaped in the form of a tension spring with a specific internal preload. The spring arrangement 30 is by way of a length-adjustable connecting arrangement 33 mounted for articulated movement at the transmission lever 8 and is equipped with a bent eyelet 36 allowing for articulation at an associated vehicle part. The connecting arrangement 33 is provided with a ball-shaped abutting surface 35 associated with a partially ball-shaped indentation 34 at the transmission lever 8 as well as a clamping element for a bar-shaped extension of the spring arrangement 30.

A bolt 11 is threadedly attached to the transmission lever 8 and is secured in its position by means of a locknut 12. The bolt 11 includes a partially ball-shaped end portion 13 engaging into a calotte shell-shaped indentation 14 of the tilting element 10.

The tilting element 10 has a rotationally symmetrical design and is provided on one end face with the centrally arranged calotte shell-shaped indentation 14. Adjacent to the calotte shell-shaped indentation 14 is a cone-shaped transition portion 15 which is enlarged towards the end face which allows for the swivelling movement. The radius of the calotte shell-shaped indentation 14 corresponds substantially to the radius of the partially ball-shaped end portion 13 of the bolt 11. A substantially partially ball-shaped projection 16 is associated with the indentation 14 on the other end face of the tilting element 10. In addition, a radial outer annular bead 17 is shaped on this same end face, which annular bead forms a bearing surface for the actuating tappets 2, 3. The annular bead 17 has substantially a semi-circular section. The central diameter of the annular bead 17, i.e. the diameter associated with the greatest height of the annular bead 17, corresponds to the spacing between the actuating tappets 2, 3 of the control valves, which actuating tappets are arranged in parallel beside each other.

Both actuating tappets 2, 3 contact the annular bead 17 on diametrical points on the central diameter. The dimension of the calotte shell-shaped indention 14 has been chosen such that the point about which the swivelling movement of the tilting element 10 is effected, is on the same level as the contact points of the actuating tappets 2, 3.

A flexible sealing boot 18, which seals the bearing surfaces outwardly, is interposed between the transmission lever 8 and the housing 1.

Between the transmission lever 8 and the tilting element 10, a second spring arrangement 31 is arranged, which bears, on the one hand, against the transmission lever 8 and, through the intermediary of a bearing ring, against the tilting element 10 acting as a spring plate, on the other hand. The load release of the spring arrangement 31 is limited by means of an adjustable stop 32 formed fast with the housing, against which stop the transmission lever 8 is movable into abutment with under the influence of the spring arrangement 31. When the transmission lever 8 abuts against the stop 32, a predetermined clearance distance x exists between the abutting surfaces of the tilting element 10 and the bolt 11, i.e. between the indentation 14 and the end portion 13.

The braking pressure control unit can be supplied assembled and preadjusted by the manufacturer as illustrated in FIG. 1. The spring arrangement 31 clamped between the transmission lever 8 and the tilting element 10 has a specific spring force, which has been adjusted by setting the stop 32 formed fast with the housing. The distance x between the transmission lever 8 and the tilting element 10 is fixedly set by turning the bolt 11 when the transmission lever 8 abuts against the stop 32. The spring arrangement 30 is loosely arranged at the transmission lever 8 through the intermediary of the connecting arrangement 33.

During installation, the housing 1 is attached to a first vehicle part, e.g. to the sprung part of the vehicle. With the connecting arrangement 33 released, the first spring arrangement 30 is attached by means of the end 36 to an unsprung vehicle part, the position of which is load-sensitively variable in relation to the housing 1. The spring arrangement 30, which, due to the internal preload, has a specific length, is now connected to the transmission lever 8 by means of the connecting arrangement 33 such that the transmission lever 8 is connected to the position-variable vehicle part in a clearance-free manner when said transmission lever abuts against the stop 32. The position of the end of the spring arrangement 30, which end abuts against the vehicle part in a clearance-free manner, forms a reference point (f=0) for the illustration given in FIG. 2. On the abscissa, in FIG. 2, the travel f of the spring end 36 is plotted, whereas on the ordinate, the change-over pressure is plotted. When the setting is clearance-free, i.e. f=0, the predetermined change-over-pressure $P_u$ is generated.

If the connection between the transmission lever 8 and the position-variable vehicle part is set too loosely, i.e. if the abutting surface 35 is movable away from the indentation 34 in the transmission lever 8 by $-f_1$, the change-over pressure $P_u$ will remain unchanged due to the preload of the second spring arrangement 31. This case would correspond to a displacement of the spring end 36 by $-f_1$, i.e. to the right as shown in FIG. 1.

If the distance between the transmission lever 8 and the vehicle part set by means of the connecting arrangement 33 becomes smaller than the distance actually prevailing, the transmission lever 8 lifts off the stop 32 by simultaneously compressing the second spring arrangement 31 before an extension of the spring arrangement 30 shaped in the form of a tension spring takes place. This case would correspond to a displacement of the spring end 36 to the left by e.g. $+f_1$. The change-over pressure will be slightly changed by $P_u$ due to the spring constant of the second spring arrangement.

Incorrect settings between $-f_1$ and $+f_1$ will result, in all, in a maximum change-over pressure differential $\Delta P_u$, which means only an insignificant variation of the change-over pressure.

In a braking pressure control unit, wherein the transmission lever 8 abuts directly against the actuating tappets 2, 3 without the second spring arrangement 31 being interposed and with a clearance-free setting of the actuation, however, an incorrect setting of the actuation between $-f_1$ and $+f_1$ will result in a maximum change-over pressure differential $\Delta P_u^*$, which is greater than the change-over pressure differential $\Delta P_u$ obtained in the braking pressure control unit according to the invention.

An incorrect adjustment without a significant variation of the change-over pressure is possible until the bolt 11 abuts against the tilting element 10; this would correspond to the travel $f_2$ illustrated in FIG. 2.

If, in the event of a displacement of the articulating end by $f_2$ and taking into consideration the spring force transmission, the spring force of the second spring arrangement 31 corresponds to the spring force of the first spring arrangement 30 when the transmission lever 8 abuts against the actuating tappets 2, 3 (point C in FIG. 2), the control force rises at a different rate of increase, but it increases steadily in dependence upon the travel f covered by the articulating point.

I claim:

1. A load-sensitively controllable braking pressure control unit including at least one control valve associated with a brake circuit and arranged in a housing, which is attachable to a vehicle part, at least one actuating tappet of said at least one control valve protruding from the housing, a transmission lever, which is acted upon by a first spring arrangement, adapted to be swiveled relative to the housing and is bearable against the at least one actuating tappet, said first spring arrangement having one end mounted for articulated movement to a vehicle part which moves relative to the housing, and a second end adapted to be connected to length-adjustable connecting means, said connecting means adapted to engage a free end of the transmission lever, a second spring arrangement clamped between the transmission lever and said at least one actuating tappet, and said stop means associated with the housing and the transmission lever for limiting movement of said transmission lever, a predetermined clearance distance provided between the transmission lever and said at least one actuating tappet with the transmission lever against said stop means, said first and second spring arrangements generating identical torques with the transmission lever against said at least one actuating tappet.

2. A load-sensitively controllable braking pressure control unit including at least one control valve associated with a brake circuit and arranged in a housing, which is attachable to a vehicle part, at least one actuating tappet of said at least control valve protruding from the housing, a transmission lever, which is acted upon by a first spring arrangement, adapted to be swiveled relative to the housing and is bearable against the at least one actuating tappet, said first spring arrangement having one end mounted for articulated movement to a vehicle part which moves relative to the housing, and a second end adapted to be connected to length-adjustable connecting means, said connecting means adapted to engage a free end of the transmission lever, a second spring arrangement clamped between the transmission lever and said at least one actuating tappet, and said stop means associated with the housing and the transmission lever for limiting movement of said transmission lever, a predetermined clearance distance provided between the transmission lever and said at least one actuating tappet with the transmission lever against said stop means, a spring plate disposed between said at least one actuating tappet and the second spring arrangement and a second control valve and a second actuating tappet, said spring plate abutting against each of said actuating tappets of each of said control valves, each of said actuating tappets protruding from the housing on a common side thereof.

* * * * *